United States Patent
Cook

(10) Patent No.: US 11,363,198 B2
(45) Date of Patent: Jun. 14, 2022

(54) OPTICAL SENSOR WITH JITTER STABILIIZATION

(71) Applicant: Raytheon Company, Waltham, MA (US)

(72) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/064,941

(22) Filed: Oct. 7, 2020

(65) Prior Publication Data

US 2022/0109792 A1  Apr. 7, 2022

(51) Int. Cl.
| | | |
|---|---|---|
| H04N 5/232 | (2006.01) | |
| G02B 6/42 | (2006.01) | |
| G01P 13/00 | (2006.01) | |
| G02B 27/64 | (2006.01) | |

(52) U.S. Cl.
CPC ......... *H04N 5/23264* (2013.01); *G01P 13/00* (2013.01); *G02B 6/4202* (2013.01); *G02B 27/644* (2013.01); *G02B 27/646* (2013.01)

(58) Field of Classification Search
None
See application file for complete search history.

(56) References Cited

U.S. PATENT DOCUMENTS

| | | | | |
|---|---|---|---|---|
| 9,500,518 B2 * | 11/2016 | Cook | ................... | G01S 7/4817 |
| 2011/0049328 A1 | 3/2011 | Vaillon et al. | | |
| 2012/0292482 A1 * | 11/2012 | Cook | ...................... | G01S 17/42 |
| | | | | 250/206.1 |
| 2013/0105671 A1 * | 5/2013 | Cook | ....................... | G02B 5/09 |
| | | | | 250/216 |
| 2014/0340691 A1 * | 11/2014 | Smith | .................... | G02B 5/122 |
| | | | | 356/601 |
| 2015/0001381 A1 * | 1/2015 | Shimon | ................... | G01S 17/42 |
| | | | | 250/216 |
| 2015/0177379 A1 * | 6/2015 | Smith | ................... | G01S 7/4817 |
| | | | | 356/5.09 |
| 2016/0171776 A1 * | 6/2016 | Bridges | ................ | G06T 1/0007 |
| | | | | 348/47 |
| 2016/0223394 A1 * | 8/2016 | Cook | .................... | G01S 7/4817 |
| 2016/0320630 A1 * | 11/2016 | Donaldson | ........... | G02B 27/644 |

FOREIGN PATENT DOCUMENTS

| | | |
|---|---|---|
| EP | 2590005 A1 | 5/2013 |
| WO | 2015002688 A1 | 1/2015 |

* cited by examiner

*Primary Examiner* — Timothy J Henn
*Assistant Examiner* — Wesley J Chiu
(74) *Attorney, Agent, or Firm* — Burns & Levinson LLP; Joseph M. Maraia

(57) ABSTRACT

A system and method for measuring and removing jitter from an optical sensor includes a jitter stabilization system and at least one focal plane array. The jitter stabilization system is positioned at a shared focus of the focal plane array, which can be generated by an optical imager. A jitter signal of the jitter stabilization system makes a double pass through the system, contacting every reflective surface along the optical path within the system, before returning to a position sensing detector (PSD).

18 Claims, 3 Drawing Sheets

OPTICAL SENSOR WITH JITTER STABILIIZATION

FIELD OF THE TECHNOLOGY

The subject disclosure relates to optical sensors and more particularly for jitter stabilization of an optical sensor.

BACKGROUND OF TECHNOLOGY

Optical sensors are widely used to process images of surrounding environments. Various implementations of such sensors include on ground vehicles, helicopters, and space craft, just to name a few. Movement of the optical sensors can result in the processed images appearing blurry. Therefore there is a fundamental controls problem which must be overcome to reduce image blur. This requires some measurement of the image blur (e.g. a jitter measurement), a calculation for fixing the inaccuracy, and an adjustment to the system to compensate for the inaccuracy.

Various systems and method have been implemented to remove image blur. For example, some cameras include an inertial measurement system, the camera making a correction to its image based on the inertial measurement to account for jitter. While this, and other methods, can be effective for certain systems, it can prove to be impractical and inaccurate for high performance imaging and tracking sensors where any inaccuracy in the jitter measurement (the first step in removing the image blur) can be significant. Therefore, there is a need for a system and method for accurately tracking jitter in a high performance optical sensor which can be relied on to control image jitter.

SUMMARY OF THE TECHNOLOGY

The subject technology addresses the needs described above by providing a system and method which includes a jitter stabilization system positioned at a shared focus of a focal plane array (FPA). A jitter signal from the jitter stabilization systems makes a double pass through the system, contacting every reflective surface along the optical path within the system, before returning to a position sensing detector (PSD).

In at least one aspect, the subject technology relates to an optical sensor. The optical sensor includes foreoptics configured to receive an image signal. The foreoptics are positioned at a first end of an optical path of the optical sensor. At least one FPA is configured to detect the image signal, the at least one FPA positioned at a second end of the optical path opposite the first end. A plurality of reflective surfaces are configured to reflect the image signal between the foreoptics and the at least one FPA along the optical path. The sensor includes a jitter stabilization system including a transmitter configured to transmit a jitter source signal to the foreoptics and a PSD configured to receive a returning jitter signal. The jitter stabilization system is positioned at a shared focus of the at least one FPA. A retroreflector is positioned at the first end of the optical path. The jitter source signal reflects off the retroreflector, the returning jitter signal reflecting off every reflective surface in the optical path when returning to the PSD.

In some embodiments, the optical sensor includes an optical source fiber configured to receive optical source signals at an input end, transfer the optical source signals along the optical path, and output the optical source signals at an output end. A plurality of optical sources can be configured to transmit optical source signals into the input end of the optical source fiber at a uniform polar angle such that the optical source fiber outputs an annular f-cone. The jitter source signal is transmitted to the input end of the fiber at the uniform polar angle. In some embodiments, the sensor includes optical imager configured to generate the shared focus and form a focal image on the at least one FPA. Each optical source can be positioned on a shared side of the optical imager as the at least one FPA with respect to the optical path.

In some embodiments, the optical sensor includes a gimbal axis, the optical sensor being configured to rotate around the gimbal axis. The foreoptics and retroreflector are positioned on a first side of the gimbal axis (i.e. as part of a first subsystem) and the optical imager, the optical sources, the at least one FPA, and the jitter stabilization system are positioned on a second side of the gimbal axis (i.e. as part of a second subsystem). The second side of the gimbal axis can be configured to be fixed while the first side of the gimbal axis is configured to rotate around the gimbal axis with respect to the second side.

In some embodiments, the source fiber is offset from an optical axis of the optical imager and a PSD axis of the PSD is offset on the opposite side from the optical source fiber and the optical axis. In some cases, the optical source fiber and the PSD axis are symmetric about the optical axis of the optical imager. In some embodiments, the retroreflector has an at least partially annular shape and is positioned outside dimensions of an imaging aperture of the optical sensor. The retroreflector can also be a complete annular shape positioned outside dimensions of the imaging aperture. In some embodiments, the optical sensor reflects light along the optical path using only reflective optical elements.

In some embodiments, the optical sensor includes a plurality of optical source fiber and PSD pairs located at an image of the optical imager, each optical source fiber located on a diametrically opposite side of an optical axis of the optical imager with respect to a PSD with which said optical source fiber is paired.

In at least one aspect, the subject technology relates to an optical sensor with foreoptics configured to receive an image signal. The foreoptics are positioned at a first end of an optical path of the optical sensor. At least one FPA is configured to detect the image signal. The at least one FPA is positioned at a second end of the optical path opposite the first end. A plurality of reflective surfaces reflect the image signal between the foreoptics and the at least one FPA along the optical path. A jitter stabilization system includes a transmitter configured to transmit a jitter source signal to the foreoptics and a position sensing detector PSD configured to receive a returning jitter signal. The jitter stabilization system is positioned at a shared focus of the at least one FPA. A retroreflector is positioned at the first end of the optical path and configured to reflect the jitter source signal, returning the returning jitter signal along the optical path.

In at least one aspect, the subject technology relates to a method of measuring jitter within an optical sensor. Foreoptics are positioned at a first end of an optical path of the optical sensor. The foreoptics receive an image signal. At least one FPA is positioned at a second end of the optical path opposite the first end. The at least one FPA detects the image signal. A plurality of reflective surfaces reflect the image signal between the foreoptics and the at least one FPA along the optical path. A jitter stabilization system is positioned at a shared focus of the at least one FPA. The jitter stabilization system includes a transmitter configured to transmit a jitter source signal along the optical path and a PSD configured to receive a returning jitter source signal. A retroreflector is positioned at the first end of the optical path. The jitter source signal reflects off the retroreflector before returning to the PSD along the optical path, the returning jitter signal reflecting off every reflective surface in the optical path when returning to the PSD.

In some embodiments, an optical source fiber is provided offset from the optical path and having an input end and an output end. The optical source fiber receives optical source signals at the input end and transfers the optical source signals along the optical path. The optical source fiber outputs the optical source signals at an output end. A plurality of optical sources transmit optical source signals into the input end of the optical source fiber at a uniform polar angle and the optical source fiber outputs an f-cone. The jitter source signal is transmitted to the input end of the fiber at the uniform polar angle.

In some embodiments, an optical imager is configured to generate the shared focus. A focal image is formed on the at least one FPA and each optical source is positioned on a shared side of the optical imager as the at least one FPA with respect to the optical path. In some embodiments, a gimbal axis is provided, the optical sensor being configured to rotate around the gimbal axis. In some cases, the foreoptics and the retroreflector are positioned on a first side of the gimbal axis and the optical imager, the optical sources, the at least one FPA, and the jitter stabilization system are positioned on a second side of the gimbal axis. The second side of the gimbal axis can be configured to be fixed while the first side of the gimbal axis can be configured to rotate around the gimbal axis with respect to the second side.

In some embodiments, the optical source fiber is offset from an optical axis of the optical imager. A PSD axis of the PSD is offset from the source fiber and the optical axis. The optical source fiber and the PSD axis are symmetric about the optical axis of the optical imager. In some cases, the retroreflector has an at least partially annular shape and is positioned outside dimensions of an imaging aperture of the optical sensor. In some embodiments, the optical sensor can reflect light along the optical path using only reflective optical elements.

In some embodiments, a plurality of optical source fiber and PSD pairs are positioned at an image of the optical imager such that each optical source fiber is located on a diametrically opposite side of an optical axis of the optical imager with respect to a PSD with which said optical source fiber is paired.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
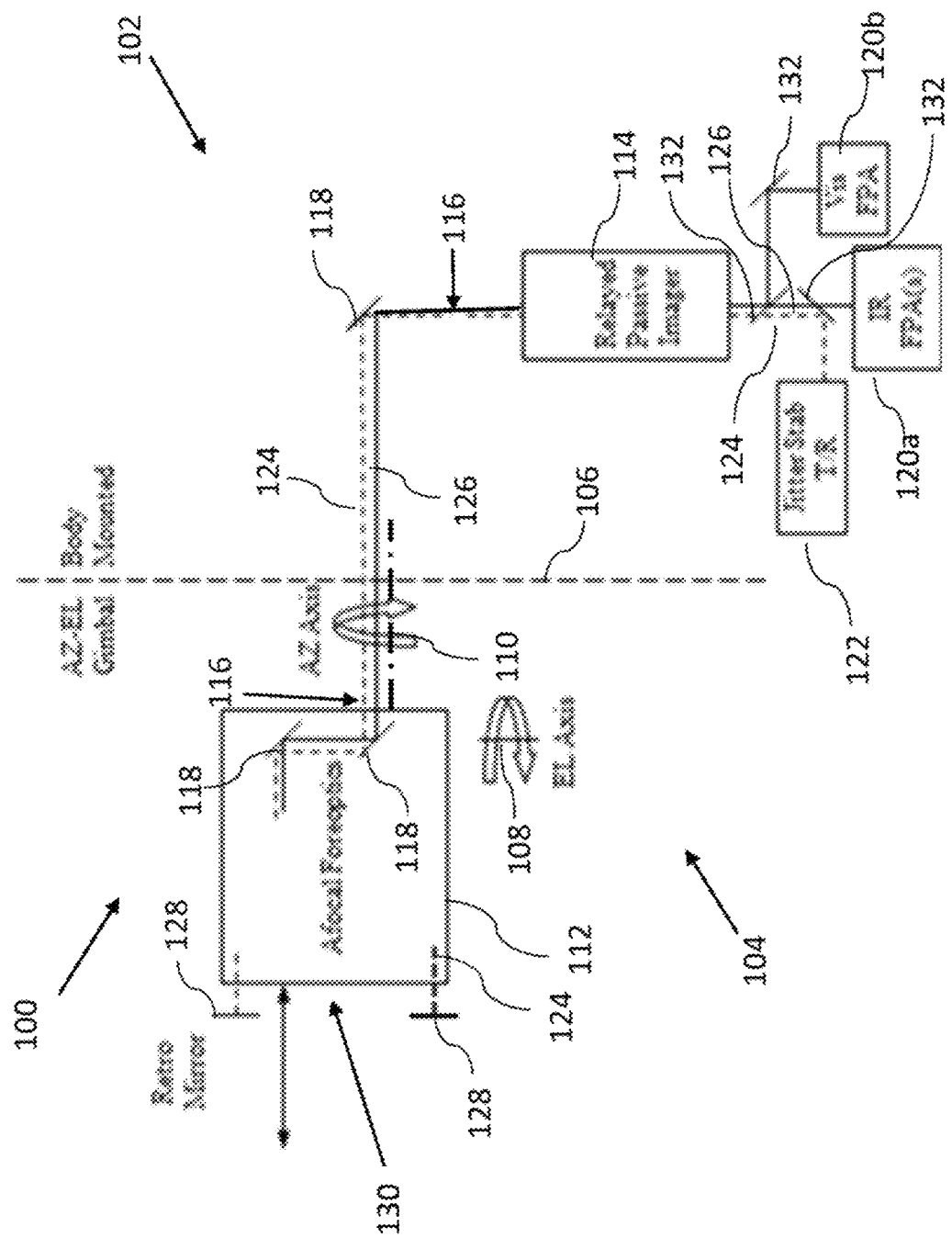
FIG. 1 is a block diagram of an optical sensor in accordance with the subject technology

The subject technology overcomes problems in the prior art associated with optical sensors for tracking and imaging.

In brief summary, the subject technology provides a more accurate jitter measurement by positioning a jitter stabilization device at a focus that is common to the imaging FPA, and allowing the jitter signal to make a double pass through the system. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Referring now to FIG. 1, a block diagram of an optical sensor 100 in accordance with the subject technology is shown. The sensor 100 is designed to be mounted on a movable body, such as for a vehicle, aircraft, or the like. To that end, the sensor 100 includes a first subsystem 102 which is mounted and fixed on the vehicle body. A second subsystem 104 is divided from the first subsystem 102 by a gimbal (e.g. arranged at dividing line 106), which defines a pivot point between the subsystems 102, 104. The gimbal allows the second subsystem 104 to rotate, with respect to the first subsystem 102, around one or more gimbal axes 108, 110. In the example shown the second subsystem 104 can rotate in a first direction around a first gimbal axis 108 which allows for scanning in an elevation direction. The second subsystem 104 can also rotate in a second direction around a second gimbal axis 110 which allows for scanning in an azimuth direction.

The sensor includes afocal foreoptics 112 and a relayed passive imager 114. All optical signals within the sensor 100 are directed along an optical path 116 between the foreoptics 112 and the imager 114, with the exception of source signals which can be conveyed on an optical fiber offset from the optical path. Optical signals are guided along the optical path 116 by a number of reflective mirrors 118. The reflective mirrors 118 define the optical path 116 with reflective optical elements, such as reflective metal surfaces. No powered lenses are required, as the optical path 116 is defined only by reflective optical elements.

The imager 114 is a focal system which is configured to form an image on a number of image detectors at the shared focus of the imager 114 based on an image signal 126. In the exemplary optical sensor 100, the image detectors include an IR focal plane array (FPA) 120a and a visible light FPA 120b, although it should be understood that other FPAs, or other detectors, may also be included. Generally, the FPAs 120a, 120b (generally 120) are passive FPAs that record a scene image. Near each FPA 120, one or more optical sources (not shown distinctly) can also be included to transmit outgoing jitter source signals. The sensor 100 also includes a jitter stabilization measurement system 122 located at the focus of the imager 114. The jitter stabilization system 122 includes transmitters configured to transmit a jitter source signal 124 along an optical fiber offset from the optical path 116, and a position sensing detector (PSD) configured to detect the returning jitter signal 124. Several dichroic beam splitters 132 convey optical signals between the imager 114 and the detectors 120 and jitter stabilization system 122. Since the total angular departure of the jitter measurement beam is modest compared to the sensor field of view, the PSD can be sized much smaller than the size of the FPAs 120. Due to the all reflective optical path 116, the sensor 100 has no wavelength restrictions on the optical signals 124, 126. Jitter source and PSD can both be chosen for availability, low cost, and peak performance.

The optical sensor 100 is configured such that the jitter source signal 124 will sample every reflective surface 118 within the optical path 116 during its return path. The jitter source signal 124 is normally conveyed adjacent the optical path 116 by an optical source fiber. At the foreoptics 112, the jitter source signal 124 contacts, and is returned by, a retroreflective mirror 128. As will be discussed in more detail herein, the jitter source signal 124 is conveyed through the foreoptics 112 in a cone pattern, forming an annular shape. Therefore the retroreflector 128 can be arranged in partial or complete annular shape outside the dimensions of the imaging aperture 130 of the foreoptics 112. The retroreflector 128 reflects the transmitted jitter signal 124 back along the optical path 116 of the imaging signals, where it is directed back to the PSD by the reflective surfaces 118 defining the optical path 116. Therefore, the jitter signal 124 makes a double pass through the sensor 100.

This arrangement yields a number of advantages. By positioning the jitter stabilization system 122 at the focus conjugate to the FPAs 120 and using a retroreflector 128 around the imaging aperture 130, the jitter signal 124 is able traverse the optical source fiber adjacent the optical path and traverse the optical path 116, sampling every surface 118 touched by optical signals 126. This results in a jitter measurement that more accurately tracks actual jitter error being experienced in the optical signal 126 being imaged onto the FPAs 120, including capturing any error brought on by gimbal movements. The jitter measurement can then be utilized to make adjustments to the scene image being recorded by the FPAs 120.

Figure 2A:
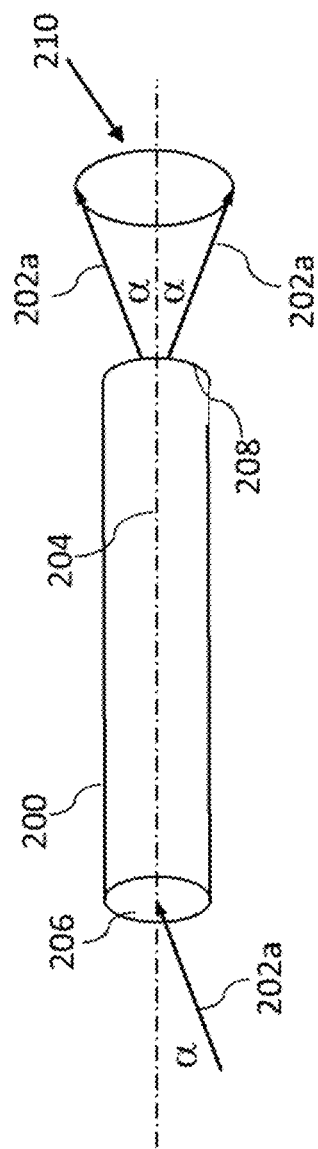
FIGS. 2a-2b are exemplary diagrams of the incident angles of optical source signals on source fibers in accordance with the subject technology.
Figure 2B:
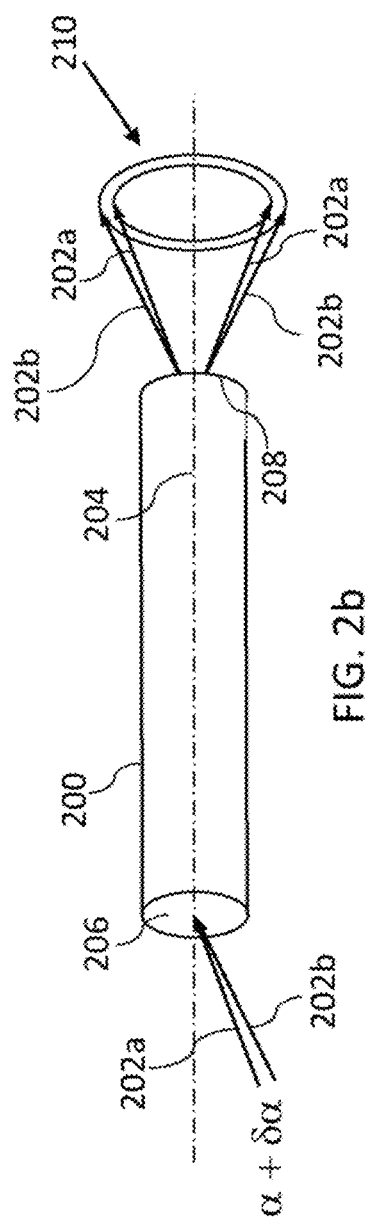

Referring now to FIGS. 2a-2b, an exemplary source fiber 200 for transmitting the optical source signals 202a, 202b for a sensor 100 in accordance with the subject technology is shown. In particular, FIG. 2a shows an example of the intended path of the transmitted optical signal 202a for a single ray, while FIG. 2b shows an optical signal 202b for a small angle f-cone input. The source fiber 200 can be implemented as described below within the sensor 100 to transmit all outgoing optical signals, including the jitter source signal 124, between the imager 114 and the foreoptics 112.

The optical source fiber 200 is configured to be illuminated, by the optical sources, at an off-axis angle with respect to a central fiber axis 204. All optical sources transmitting through the optical source fiber 200 can illuminate the fiber 200 with an optical signal 202a, 202b, at an input end 206 of the optical source fiber 200, at a given incident angle ($\alpha$) (or $\alpha+\alpha\delta$). The optical signal 202a, 202b will then be output from an output end 208, forming a full f-cone 210 with the same angle ($\alpha$ or $\alpha+\alpha\delta$) with respect to the fiber axis 204. The input angle is further configured to be uniform for all optical sources illuminating the optical source fiber 200. Having multiple focused sources, all incident on the fiber 200 at the same polar angle (e.g. arranged in a ring) contributes to a stronger and more uniform output annulus. The annular output beam also allows the jitter signal to interact with a partial, or full, annular shaped retroreflector (e.g. retroreflector 128), avoiding any undesirable aperture obscuration (or other central obscuration).

Figure 3B:
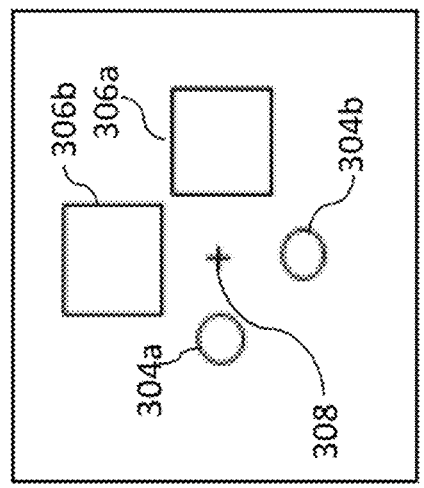
FIG. 3b is a diagram showing an arrangement of source fiber/PSD pairs with respect to an imager axis.
Figure 3A:
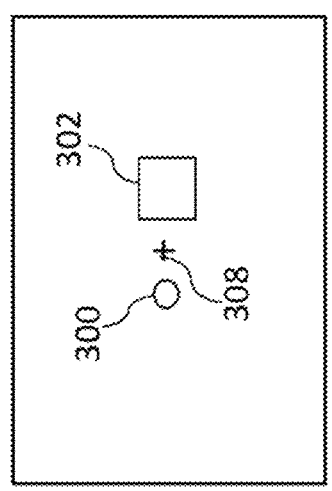
FIG. 3a is a diagram showing an arrangement of a source fiber, imager axis, and position sensor detector (PSD) in accordance with the subject technology.

Referring now to FIGS. 3a-3b, exemplary arrangements of source fiber and PSDs which can be implemented in the sensor 100 are shown. In particular, FIG. 3a shows an arrangement with a signal source fiber 300 and PSD 302, while FIG. 3b shows an arrangement with two source fibers 304a, 304b and two PSD 306a, 306b. FIGS. 3a-3b are arranged to show the spacing between the path of optical systems along the source fiber and PSD axes with respect to that of the optical imager.

As shown in FIG. 3a, the source fiber 300 and PSD 302 are spaced offset from an optical axis 308 of the optical imager 114. Further, the source fiber 300 and PSD 302 are arranged such that they are diametrically and symmetrically opposite one another about the imager axis 308. Since the sensor 100 is configured to move about gimbal axes, this arrangement allows the source fiber 300 and PSD 302 to maintain the required orientation with respect to the field of view of the sensor 100, regardless of rotations that may be introduced by through gimbal movements.

The arrangement of FIG. 3b functions similarly to the arrangement of the FIG. 3a, except that two source fiber/PSD pairs are shown. In particular, the first pair is comprised of the source fiber 304a and PSD 306a, while the second pair is comprised of source fiber 304b and PSD 306b. Due to the imaging nature of the optical train, signals from a given source fiber 304a, 304b can only return to the PSD 306a, 306b located on the diametrically opposite side of the imager axis 308. Thus, each pair includes one source fiber 304a, 304b and a corresponding PSD 306a, 306b on the opposite side of the imager axis 308. Signals through source 304a are returned to PSD 306a and signals through source 304b are returned to PSD 306b. Each pair functions to maintain the proper orientation or source and PSD despite movement of the sensor 100 around gimbal axes 108, 110, as described with respect to FIG. 3a. It should be understood that while FIG. 3b shows two source fiber/PSD pairs, more pairs could be included in other embodiments, such as 3, 4, or more pairs. The additional pairs would follow an orientation in accordance with the arrangement of FIG. 3b, with each source fiber being arrangement diametrically and symmetrically opposite the corresponding PSD with which it is paired about the imager axis 308.

It should be understood that the sensor 100 of the subject technology allows for the accurate measurement of scene jitter at a bandwidth much higher than that of the frame time of a prior art imaging sensor. The former measurement bandwidth can be, for example, at 3 kilo-hertz, while the latter imaging sensor bandwidth can be, for example, at 30 hertz. Additionally, the aforementioned 3 kilo-hertz measurement of the scene jitter can be used in conjunction with a jitter correction device, such as a beam steering mirror (e.g. 118), to correct the scene jitter at some intermediate bandwidth, such as 300 hertz. Additionally, it should be understood that various other jitter correction devices, other than a conventional beam steering mirror, can be used for this correction function. Any of the known such devices may be suitable for this correction function as long as they are capable of operating at the proscribed correction bandwidth, which in the above example is 300 hertz.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment.

Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. An optical sensor comprising:
   foreoptics configured to receive an image signal, the foreoptics positioned at a first end of an optical path of the optical sensor;
   at least one focal plane array (FPA) configured to detect the image signal, the at least one FPA positioned at a second end of the optical path opposite the first end;
   a plurality of reflective surfaces configured to reflect the image signal between the foreoptics and the at least one FPA along the optical path;
   a jitter stabilization system including a transmitter configured to transmit a jitter source signal to the foreoptics and a position sensing detector (PSD) configured to receive a returning jitter signal, the jitter stabilization system positioned at a shared focus of the at least one FPA;
   a retroreflector positioned at the first end of the optical path such that the jitter source signal reflects off the retroreflector before returning to the PSD along the optical path, the returning jitter signal reflecting off every reflective surface in the optical path when returning to the PSD;
   an optical source fiber offset from the optical path and configured to receive optical source signals at an input end, transfer the optical source signals to the foreoptics, and output the optical source signals at an output end; and
   a plurality of optical sources configured to transmit the optical source signals into the input end of the optical source fiber at a uniform polar angle, wherein the optical source fiber outputs an f-cone,
   wherein the jitter source signal is transmitted to the input end of the fiber at the uniform polar angle.

2. The optical sensor of claim 1, further comprising an optical imager configured to generate the shared focus and form a focal image on the at least one FPA, wherein each optical source is positioned on a shared side of the optical imager as the at least one FPA with respect to the optical path.

3. The optical sensor of claim 2, further comprising a gimbal axis, the optical sensor configured to rotate around the gimbal axis, wherein the foreoptics and the retroreflector are positioned on a first side of the gimbal axis and the optical imager, the plurality of optical sources, the at least one FPA, and the jitter stabilization system are positioned on a second side of the gimbal axis.

4. The optical sensor of claim 3, wherein the second side of the gimbal axis is configured to be fixed and the first side of the gimbal axis is configured to rotate around the gimbal axis with respect to the second side.

5. The optical sensor of claim 2, wherein:
   the optical source fiber is offset from an optical axis of the optical imager; and
   a PSD axis of the PSD is offset from the optical source fiber and the optical axis.

6. The optical sensor of claim 5, wherein the optical source fiber and the PSD axis are symmetric about the optical axis of the optical imager.

7. The optical sensor of claim 1, wherein the retroreflector has an at least partially annular shape and is positioned outside dimensions of an imaging aperture of the optical sensor.

8. The optical sensor of claim 7, wherein the retroreflector has a complete annular shape and is positioned outside dimensions of the imaging aperture.

9. The optical sensor of claim 1, wherein the optical sensor reflects light along the optical path using only reflective optical elements.

10. The optical sensor of claim 2, further comprising a plurality of optical source fiber and PSD pairs located at an image of the optical imager, each optical source fiber located on a diametrically opposite side of an optical axis of the optical imager with respect to a PSD with which said optical source fiber is paired.

11. An optical sensor comprising:
    foreoptics configured to receive an image signal, the foreoptics positioned at a first end of an optical path of the optical sensor;
    at least one focal plane array (FPA) configured to detect the image signal, the at least one FPA positioned at a second end of the optical path opposite the first end;
    a plurality of reflective surfaces configured to reflect the image signal between the foreoptics and the at least one FPA along the optical path;
    a jitter stabilization system including a transmitter configured to transmit a jitter source signal to the foreoptics and a position sensing detector (PSD) configured to receive a returning jitter signal, the jitter stabilization system positioned at a shared focus of the at least one FPA;
    a retroreflector positioned at the first end of the optical path and configured to reflect the jitter source signal, returning the returning jitter signal along the optical path;
    an optical source fiber offset from the optical path and configured to receive optical source signals at an input end, transfer the optical source signals to the foreoptics, and output the optical source signals at an output end; and
    a plurality of optical sources configured to transmit the optical source signals into the input end of the optical source fiber at a uniform polar angle, wherein the optical source fiber outputs an f-cone,
    wherein the jitter source signal is transmitted to the input end of the fiber at the uniform polar angle.

12. A method of measuring jitter within an optical sensor comprising:
    positioning foreoptics at a first end of an optical path of the optical sensor;
    receiving, with the foreoptics, an image signal;
    positioning at least one focal plane array (FPA) at a second end of the optical path opposite the first end;
    detecting the image signal with the at least one FPA;
    reflecting, with a plurality of reflective surfaces, the image signal between the foreoptics and the at least one FPA along the optical path;
    positioning a jitter stabilization system at a shared focus of the at least one FPA, the jitter stabilization system including a transmitter configured to transmit a jitter source signal along the optical path and a position sensing detector (PSD) configured to receive a returning jitter signal;

positioning a retroreflector at the first end of the optical path, wherein the jitter source signal reflects off the retroreflector before returning to the PSD along the optical path, the returning jitter signal reflecting off every reflective surface in the optical path when returning to the PSD;

providing an optical source fiber offset from the optical path, the optical source fiber having an input end and an output end;

transmitting, by a plurality of optical sources, optical source signals into the input end of the optical source fiber at a uniform polar angle, wherein the optical source fiber outputs an f-cone, receiving, by the optical source fiber, the optical source signals at the input end;

transferring, by the optical source fiber, the optical source signals to the foreoptics; and outputting, by the optical source fiber, the optical source signals at the output end, wherein the jitter source signal is transmitted to the input end of the optical source fiber at the uniform polar angle.

13. The method of claim 12, further comprising:

providing an optical imager configured to generate the shared focus; and forming a focal image on the at least one FPA, wherein each optical source is positioned on a shared side of the optical imager as the at least one FPA with respect to the optical path.

14. The method of 13, further comprising providing a gimbal axis, the optical sensor configured to rotate around the gimbal axis, wherein:

the foreoptics and the retroreflector are positioned on a first side of the gimbal axis and the optical imager, the plurality of optical sources, the at least one FPA, and the jitter stabilization system are positioned on a second side of the gimbal axis; and the second side of the gimbal axis is configured to be fixed and the first side of the gimbal axis is configured to rotate around the gimbal axis with respect to the second side.

15. The method of claim 13, wherein:

the optical source fiber is offset from an optical axis of the optical imager;

a PSD axis of the PSD is offset from the optical source fiber and the optical axis; and the optical source fiber and the PSD axis are symmetric about the optical axis of the optical imager.

16. The method of claim 12, wherein the retroreflector has an at least partially annular shape and is positioned outside dimensions of an imaging aperture of the optical sensor.

17. The method of claim 12, wherein the optical sensor reflects light along the optical path using only reflective optical elements.

18. The method of claim 13, further comprising positioning a plurality of optical source fiber and PSD pairs at an image of the optical imager such that each optical source fiber is located on a diametrically opposite side of an optical axis of the optical imager with respect to a PSD with which said optical source fiber is paired.

* * * * *